US012704360B1

(12) United States Patent
Beal et al.

(10) Patent No.: US 12,704,360 B1
(45) Date of Patent: Aug. 11, 2026

(54) CARBON FIBER AMMUNITION CASING

(71) Applicants: Harold F. Beal, Luling, TX (US); Jordan Tyler Dishman, Lenoir City, TN (US); Connie Diane Jackson, Harriman, TN (US)

(72) Inventors: Harold F. Beal, Luling, TX (US); Jordan Tyler Dishman, Lenoir City, TN (US); Connie Diane Jackson, Harriman, TN (US)

(73) Assignee: Harold Beal, Luling, TX (US)

( * ) Notice: Subject to any disclaimer, the term of this patent is extended or adjusted under 35 U.S.C. 154(b) by 0 days.

(21) Appl. No.: 19/401,197

(22) Filed: Nov. 25, 2025

(51) Int. Cl.
*F42B 5/26* (2006.01)
*B33Y 10/00* (2015.01)
*F42B 5/30* (2006.01)
*F42B 33/00* (2006.01)

(52) U.S. Cl.
CPC ................ *F42B 5/26* (2013.01); *B33Y 10/00* (2014.12); *F42B 5/30* (2013.01); *F42B 33/00* (2013.01)

(58) Field of Classification Search
CPC .... F42B 5/26; F42B 5/30; F42B 5/307; F42B 5/313; F42B 33/00; F42B 33/001; B33Y 10/00
USPC ................................................. 102/464–472
See application file for complete search history.

(56) References Cited

U.S. PATENT DOCUMENTS

| | | | | |
|---|---|---|---|---|
| 6,038,979 | A * | 3/2000 | Watson | F42B 12/76 60/39.1 |
| 7,610,858 | B2 * | 11/2009 | Chung | F42B 5/313 102/466 |
| 8,561,543 | B2 | 10/2013 | Burrow | |
| 9,091,516 | B2 * | 7/2015 | Davies | F42B 5/313 |
| 10,048,049 | B2 * | 8/2018 | Burrow | F42B 5/36 |
| 10,173,410 | B2 * | 1/2019 | Nardiello | B29C 64/30 |
| 11,279,080 | B2 * | 3/2022 | Barr | B29C 64/118 |
| 12,442,624 | B2 * | 10/2025 | Murarash | F42B 12/78 |
| 2025/0230291 | A1 * | 7/2025 | Anzelmo | C08K 3/042 |
| 2025/0334387 | A1 * | 10/2025 | Carmona | B29C 45/14631 |

* cited by examiner

*Primary Examiner* — James S Bergin
(74) *Attorney, Agent, or Firm* — Burdick Patents, P.A.; Sean D. Burdick; Colin L. Honan

(57) ABSTRACT

A carbon fiber reinforced ammunition casing consists of a singular piece or two complementary longitudinal half sections coupled together. The half sections are formed with radial edges having complementary tongues and grooves to allow coupling of the half sections to complete the casing. A weld is applied along each seam where the half sections couple together and excess weld material is removed by press proofing. Each singular piece or half section is formed by injection molding or additive manufacturing of a mixture of carbon fiber and polymer.

7 Claims, 5 Drawing Sheets

SECTION A-A

SECTION B-B

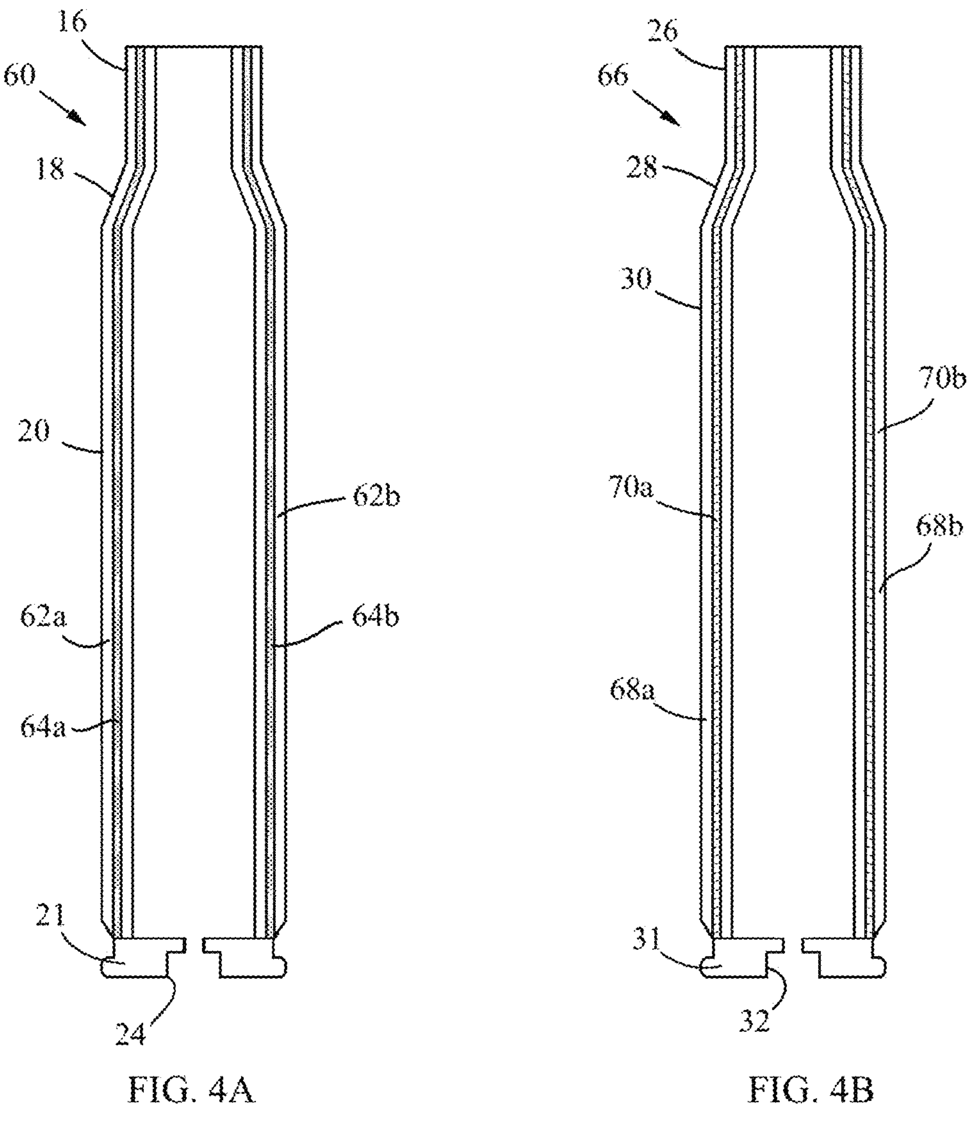
FIG. 4A
FIG. 4B
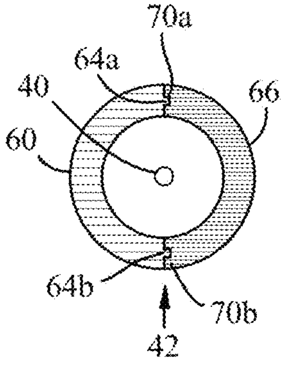
FIG. 4C

CARBON FIBER AMMUNITION CASING

BACKGROUND OF THE INVENTION

Field of the Invention

The present invention relates to the field of ammunition casings, and, more specifically, to composite ammunition casings and related methods for manufacture.

Description of Related Art

Conventional ammunition cartridges have long been made from brass, which is expensive, heavy, and potentially hazardous. In terms of military use, the weight of brass cartridges en masse adds significantly to the overall weight a soldier or vehicle must carry. This limits the amount of brass cartridges that the individual soldier can carry on their person and presents further logistical issues for transportation and use by military vehicles. For instance, a box of 0.50 caliber brass ammunition cartridges (approximately 100 cartridges) plus links can weigh about 35 pounds.

Thus, there has long been a need for a lighter weight alternative to the conventional brass ammunition cartridge. Polymer cartridges have been considered a desirable alternative to brass cartridges for decades but prior polymer cartridges have not yet met industry and military performance standards.

These known polymer cartridges have proved expensive to manufacture en masse due to specialized parts needed to ensure the cartridges function safely when fired. For instance, U.S. Pat. No. 8,561,543 (the "'543 Patent") teaches a polymer cartridge engaged to a metallic base end piece. In the '543 Patent, the metal base piece provides the structural integrity necessary for the spent casing to be extracted from a firearm. However, the metal base piece adds to the overall weight of the cartridge, thereby reducing the actual weight savings achieved. Further, the metal base piece increases the complexity and costs of manufacturing by requiring additional material and stages to form the base piece prior to the molding operation.

The '543 Patent also teaches the need for a diffuser to divert the heat and energy generated from the detonation of a primer loaded into the primer pocket of the base end piece. The diffuser, which is a small circular piece of metal with a central aperture, is positioned in the primer pocket prior to primer loading. The metal diffuser ensures that the heat and energy from the primer detonation does not weaken the joint between the polymer cartridge and the metal base end piece to the point of failure. The necessity of the diffuser has increased the cost of production for these cartridges and adds weight to the overall cartridge assembly, an undesirable outcome where weight reduction is a primary driving force for development of composite ammunition cartridges. When considering a soldier carrying upwards of 200 cartridges, the diffusers en masse may add four or more ounces to the total weight a soldier must carry. When the weight of the diffuser is combined with the weight of the metal base piece, the actual weight savings achieved by an ammunition cartridge designed according to the '543 Patent is diminished and may not justify the increased manufacturing costs.

What is needed is a composite ammunition casing that solves the abovementioned problems while providing the structural reliability and consistency in performance achieved by the equivalent legacy metal casings.

SUMMARY OF THE INVENTION

The present invention resolves the above problems with composite ammunition casings by utilizing carbon fiber construction materials that offer increased strength over existing polymer casing while increasing the weight reduction when compared to traditional metal casings. To achieve the necessary structural reliability and performance consistency with carbon fiber materials, the inventor has determined a specialized case structure and manufacturing method are required. The present invention calls for the ammunition casing to be manufactured in two longitudinal halves that are coupled together to form the complete casing. The present invention has eliminated the need for a separate metal base piece that is required in existing polymer casings to maintain the structural integrity. The present invention has also eliminated the need for an additional metal disk inside the primer pocket. The carbon fiber based materials used to form the casing according to the present invention provide the necessary structural integrity to withstand primer detonation and the subsequent extraction of the spent casing from a firearm without requiring metal components to divert or redirect the initial primer explosion. Further, by forming the ammunition casing in two longitudinal half sections, the present invention has eliminated weak spots present in prior composite casings that utilized two or more sections coupled together to form the casing and allows for the normal extraction from a firearm of the spent casing without experiencing case head separation common in previous polymer casings.

In one embodiment, an ammunition casing according to the present invention has a first longitudinal half and a second longitudinal half that is complementary to the first longitudinal half. The first longitudinal half has a first half neck that extends into a first half shoulder. The first half shoulder transitions into a first half body that has a first half primer pocket formed in the bottom end thereof. The second longitudinal half similarly includes a second half neck that extends into a second half shoulder which transitions into a second half body. A complementary second half primer pocket is formed in the bottom end of the second half body. The casing also includes a means for coupling the first longitudinal half to the second longitudinal half to form the completed casing.

In some embodiments, each of the first longitudinal half and the second longitudinal half has a sidewall with a defined thickness. Preferably, the coupling means is formed in the thickness of the sidewall for each of the first longitudinal half and the second longitudinal half. In some embodiments, the coupling means may include at least one protrusion extending from the sidewall thickness of the first longitudinal half and at least one complementary notch formed in the sidewall thickness of the second longitudinal half. The at least one protrusion is designed to engage the at least one notch to couple the two halves together. The coupling means may also include a weld. Preferably, the weld is applied along a seam that is formed where the first longitudinal half couples to the second longitudinal half. Preferably, the weld is applied through the outer surface of the casing according to known laser welding techniques. In some alternative embodiments, the coupling means may include a plurality of protrusions extending from the sidewall thickness of the first longitudinal half and a plurality of complementary notches formed in the sidewall thickness of the second longitudinal half. The protrusions and the notches may be formed in one or both of the radial edges of each of the first and the second longitudinal halves. In some embodiments, the first longitudinal half may include both protrusions and notches, the protrusions extending from one radial edge and the notches extending from the other radial edge of the first longitudinal half. The second longitudinal half similarly may include both protrusions and notches arranged to be complementary to those provided on the first longitudinal half.

In some embodiments, the coupling means includes a single tongue extending along the first longitudinal half and a singular groove formed in the second longitudinal half. In such an embodiment, the tongue is designed to engage the groove to couple the first longitudinal half to the second longitudinal half. The coupling means may also include a weld. Preferably, the weld is applied along the seam created where the first longitudinal half couples to the second longitudinal half. Each of the first longitudinal half and the second longitudinal half have two radial edges. In some embodiments, the tongue of the first longitudinal half may extend from each radial edge thereof. Similarly, the groove of the second longitudinal half may be formed in each radial edge thereof.

In preferred embodiments, the first longitudinal half and the second longitudinal half include a carbon fiber material. The carbon fiber material may be a carbon fiber reinforced polymer that is suitable for use in an injection molding process. In alternative embodiments, a carbon fiber reinforced polymer suitable for use in an additive manufacturing processes, e.g., 3-D printing, is used to form the casing according to the present invention.

In further embodiments, the present invention relates to a method for manufacturing an ammunition casing. In preferred embodiments, the method includes molding a first longitudinal half and molding a second longitudinal half. The first longitudinal half is molded to include a first half neck that extends to a first half shoulder. The first half shoulder transitions into a first half body that has a first half primer pocket formed in the bottom end thereof. A tongue is molded to extend from at least one radial edge of the first longitudinal half. Similarly, the second longitudinal half is molded to include a second half neck that extends to a second half shoulder. The second half shoulder transitions into a second half body that has a second half primer pocket formed in the bottom end thereof. A groove is defined in at least one radial edge of the second longitudinal half. After molding of the first longitudinal half and molding of the second longitudinal half, the method calls for aligning the first longitudinal half with the second longitudinal half so that the tongue engages the groove to form a seam. The seam is formed where the two halves couple together. The final step of the method involves welding, along the seam, the first longitudinal half to the second longitudinal half to form the casing.

In some preferred embodiments, each of the first longitudinal half and the second longitudinal half are molded using a carbon fiber reinforced polymer. Preferably, the welding step involves laser welding. In some embodiments, the at least one radial edge of the first longitudinal half includes a first radial edge and a second radial edge. The molding step may involve molding a tongue to extend from both the first radial edge and the second radial edge. Alternatively, the molding step may involve molding the tongue to extend from the first radial edge and molding a groove into the second radial edge. Along similar lines, the at least one radial edge of the second longitudinal half may include a third radial edge and a fourth radial edge. The molding step may involve molding the groove in both the third radial edge and the fourth radial edge. The two-grooved second longitudinal half is complementary to the two-tongued first longitudinal half. Alternatively, the molding step may involve molding the groove into the third radial edge and molding a tongue to extend from the fourth radial edge so as to be complementary to the tongue plus groove embodiment of the first longitudinal half. In any of these previously described embodiments, the aligning step involves aligning the first longitudinal half with the second longitudinal half to form a first seam and a second seam, i.e., a seam formed where each radial edge joins together. The weld is applied along each of the first seam and the second seam.

In further embodiments of the present invention, a precursor ammunition casing is disclosed. The precursor ammunition casing has a longitudinal casing half defining a first radial edge and a second radial edge. The longitudinal casing half has a half neck that extends into a half shoulder which transitions into a half body. A half primer pocket is formed in the bottom end of the half body. A tongue extends from at least one of the first radial edge or the second radial edge. In some embodiments, a groove is formed in the other one of the first radial edge or the second radial edge.

BRIEF DESCRIPTION OF THE DRAWINGS

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims. Component parts shown in the drawings are not necessarily to scale, and may be exaggerated to better illustrate the important features of the invention. Dimensions shown are exemplary only. In the drawings, like reference numerals may designate like parts throughout the different views, wherein:

FIG. 4A is a cross-sectional side view, taken along line A-A, of a second embodiment of a longitudinal half for an ammunition casing according to the present invention.

FIG. 4B is a cross-sectional side view, taken along line A-A, of an embodiment of a longitudinal half of ammunition casing that is complementary to the longitudinal half shown in FIG. 4A.

FIG. 4C is a cross-sectional end view, taken along line B-B, of an embodiment of a completed casing according to the present invention, the casing being the combination of the longitudinal halves shown in FIGS. 4A and 4B.

DETAILED DESCRIPTION OF THE INVENTION

The following disclosure presents exemplary embodiments of a carbon fiber ammunition casing. The carbon fiber ammunition casing according to the present invention is stronger and more reliable than previous attempts at composite ammunition casings, namely, polymer casings. The presently disclosed ammunition casing is formed in two longitudinal half-sections that are welded together to form the completed casing. A specialized coupling means is formed in the sidewall thickness of each longitudinal half-section so that the welded portion of the casing causes material from each half-section to meld together. This forms a stronger, more reliable longitudinal joint than what has been attempted in the prior art, e.g., circumferential joints that subject the cartridge to case head separation.

Figure 1:
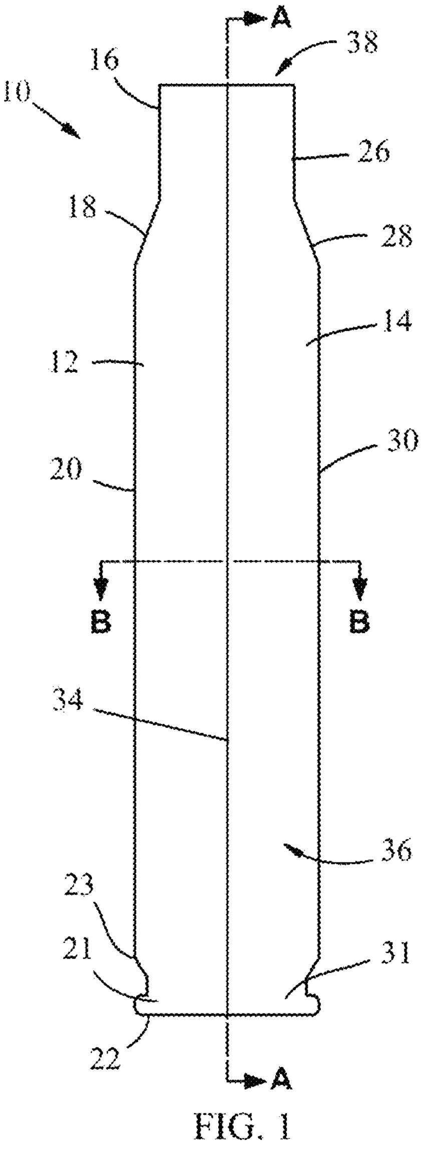
FIG. 1 is a side view of an embodiment of a completed ammunition casing according to the present invention.

FIG. 1 is a side view of an embodiment of an ammunition casing according to the present invention. The ammunition casing 10 is made up of a first longitudinal half 12 coupled to a second longitudinal half 14. The first longitudinal half 12 includes a first half neck 16 that extends into a first half shoulder 18. The first half shoulder 18 transitions into a first half body 20. A first half primer pocket 24 (not shown in FIG. 1) is formed through the bottom end 22 of the first half body 20. In some embodiments, the first half body 20 may transition into a first half head 21, with the first half primer pock 24 formed through the bottom end 22 of the first half head 21. The first half head 21 may be formed with an extraction groove 23 for facilitating loading and spent case removal in a firearm.

The second longitudinal half 14 is complementary to the first longitudinal half 12 so that when coupled together the complete casing 10 is produced. As such, the second longitudinal half 14 includes a second half neck 26 that extends into a second half shoulder 28. The second half shoulder 28 transitions into the second half body 30. A second half primer pocket 32 is formed through the bottom end 22 of the second half body 30. Similar to the first longitudinal half 12, the second half body 30 may transition into a second half head 31 and the second half primer pocket 32 is formed therethrough. The extraction groove 23 is similarly formed in the second half head 31 forming an annular extraction groove 23 for the casing 10.

When coupled together, the first half head 21 and the second half head 31 combine to form the casing head, which has a material thickness greater than other portions of the casing 10. The added material thickness to the casing head is to ensure the casing 10 functions reliably and does not structurally fail upon primer detonation and the subsequent spent casing extraction from the firearm after discharge.

It should be understood that the first longitudinal half 12 and the second longitudinal half 14 are substantially identical halves of the casing 10. Each of the first longitudinal half 12 and the second longitudinal half 14 are essentially one-half of a cylinder with discrete areas of taper, e.g., at the body into the shoulder and the shoulder into the neck, that give the casing 10 its bottleneck configuration, e.g., FIG. 1. Where the casing 10 is formed as a straight-walled ammunition casing, such as for some pistol ammunition casing, each of the first longitudinal half 12 and the second longitudinal half 14 may be substantially half of a cylinder with no major areas of taper. A straight-walled ammunition casing according to the present invention may still be formed with the extraction groove 23 extending circumferentially around the bottom end 22.

When coupled together, the first half neck 16 and the second half neck 26 combine to form the projectile opening 38. The projectile opening 38 is sized according to the caliber of ammunition for which the casing 10 is designed. The projectile opening 38 engages a projectile, typically by friction-fit. In some embodiments, an adhesive may be added to the inner surface of the projectile opening 38 to further secure the projectile therein. Similarly, when coupled together, the first half primer pocket 24 and the second half primer pocket 32 combine to form a primer pocket 40 that is sized to receive a conventional ammunition primer. The primer pocket 40 includes a flash hole that places the primer pocket 40 in fluid communication with the internal powder chamber of the casing 10, which is defined as the internal volume of the casing 10 between the projectile opening 38 and the case head 21 and 31.

A seam 34 is formed in the outer surface 36 where the first longitudinal half 12 couples to the second longitudinal half 14 via a coupling means 42. The outer surface 36 of the casing 10 is substantially smooth, including at the location of the seam 34. The smooth outer surface 36 of the casing 10 ensures compatibility with existing weapons platforms, i.e., there are no surface protrusions that could interfere with the cartridge chamber of an existing firearm having the same caliber as the casing 10.

Figure 2:
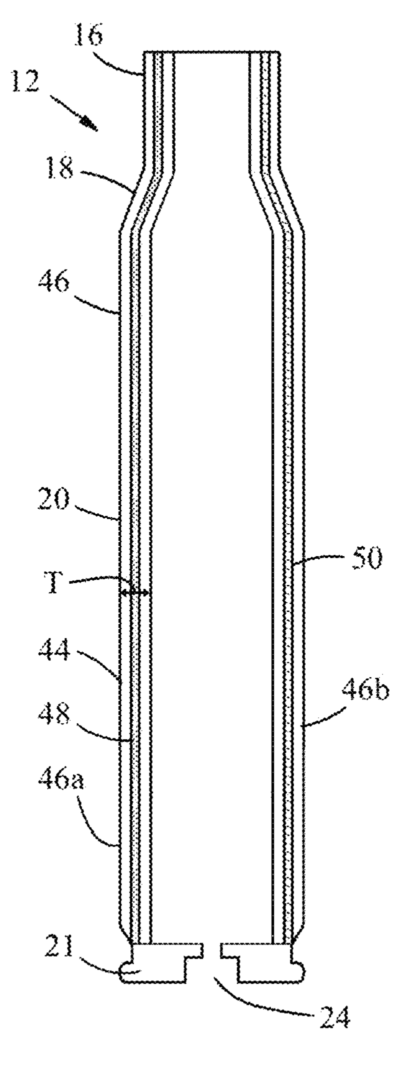
FIG. 2 is a cross-sectional side view, taken along line A-A, of a first embodiment of a longitudinal half for an ammunition casing according to the present invention.

FIG. 2 is a side cross-sectional view, taken along line A-A marked in FIG. 1, of an embodiment of one longitudinal half of an ammunition casing according to the present invention. In the embodiment shown, the longitudinal half illustrated by FIG. 2 can be considered the first longitudinal half 12 or the second longitudinal half 14. In preferred embodiments, the first longitudinal half 12 and the second longitudinal half 14 are substantially mirror images of one another so that when coupled together, the complete casing 10 is formed. For ease of understanding and clarity in the drawing, describe FIG. 2 is described by referencing the first longitudinal half 12 and the component parts thereof. It should be understood that the same description of FIG. 2 with reference to the second longitudinal half 14 and the component parts thereof applies.

The first longitudinal half 12 has a sidewall 44 with a defined thickness T. In some preferred embodiments, the means for coupling 42 the first longitudinal half 12 to the second longitudinal half 14 is formed in the thickness T of the sidewall 44. More precisely, each radial edge 46 of the first longitudinal half 12 is formed with a portion of the coupling means 42 and is designed to interface in complementary fashion with the radial edges of the second longitudinal half 14. The radial edge 46 is defined as the end surface of the sidewall 44. Each longitudinal half 12 and 14 has two radial edges **46*a* and 46*b***, i.e., the left and right edge of each longitudinal half section.

In some embodiments, the first radial edge **46*a* may be formed with a tongue 48 and the second radial edge 46*b* may be formed with a groove 50. The tongue 48 is designed to interface with a groove 50 formed in the radial edge 46 of the second longitudinal half 14 and the groove 50 is designed to interface with a tongue 48 formed in the other radial edge 46 of the second longitudinal half 14. The coupling means 42 in one embodiment is therefore a tongue-and-groove engagement of the first longitudinal half 12 with the second longitudinal half 14 to form the casing 10. In preferred embodiments, the coupling means 42 includes a weld subsequently applied to the seam 34 to ensure the engagement between the first longitudinal half 12 and the second longitudinal half 14** is secured and reliable. Preferably, laser welding techniques are used.

In some preferred embodiments, such as that illustrated in FIG. 2, the tongue 48 and the groove 50 extend substantially the entire length of the radial edge 46 for the first longitudinal half 12. In some embodiments, the tongue 48 and the groove 50 may terminate at the first half head 21, as shown in FIG. 2.

Figure 3:
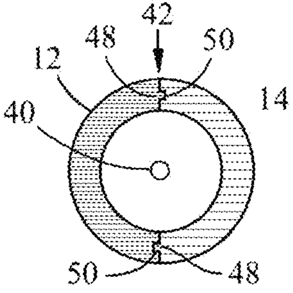
FIG. 3 is a cross-sectional end view, taken along line B-B, of a first embodiment of a completed casing according to the present invention.

FIG. 3 is a cross-sectional end view, taken along line B-B marked in FIG. 1, of an embodiment of a casing according to the present invention. FIG. 3 illustrates the embodiment of casing 10 that would be provided from the longitudinal half shown in FIG. 2. The coupling means 42 can be seen where the tongue 48 of the first longitudinal half 12 engages the groove 50 of the second longitudinal half 14 and the tongue 48 of the second longitudinal half 14 engages the groove 50 of the first longitudinal half 12.

FIGS. 4A to 4C illustrate a second embodiment of a casing according to the present invention. FIGS. 4A and 4B are taken along the same section lines A-A marked in FIG. 1 and FIG. 4C is taken along section line B-B marked in FIG. 1. FIG. 4A is a cross-sectional side view of one longitudinal half and FIG. 4B is a cross-sectional side view of a second, complementary longitudinal half. FIG. 4C is a cross-sectional end view of an embodiment of a casing according to the present invention.

The first longitudinal half 60 shown in FIG. 4A is substantially similar to the first longitudinal half 12 discussed above. As such, the first longitudinal half 60 includes a first half neck 16 that extends into the first half shoulder 18. The first half shoulder 18 transitions into a first half body 20 that extends to the first half head 21. The first half primer pocket 24 is formed through the first half head 21. The first longitudinal half 60 has a first radial edge 62*a* formed with a first tongue 64*a* and a second radial edge 62*b* formed with a second tongue 64*b*.

FIG. 4*b* illustrates a second longitudinal half 66 that is substantially similar to the second longitudinal half 14 discussed above. As such, the second longitudinal half 66 includes a second half neck 26 that extends into the second half shoulder 28. The second half shoulder 28 transitions into the second half body 30 that extends to the second half head 31. The second half primer pocket 32 is formed through the second half head 31. The second longitudinal half 66 includes a first radial edge 68*a* formed with a first groove 70*a* and a second radial edge 68*b* formed with a second groove 70*b*.

The coupling means 42 is a tongue-and-groove engagement between the first longitudinal half 60 and the second longitudinal half 66. The first tongue 64*a* preferably engages the first groove 70*a* and the second tongue 64*b* engages the second groove 70*b*. In preferred embodiments, the coupling means 42 further includes a weld applied to the seam 34 where the first longitudinal half 60 couples with the second longitudinal half 66. FIG. 4C shows the coupling means 42 where the first and second tongues 64*a*, 64*b* engage with the first and second grooves 70*a*, 70*b*.

Figure 5:
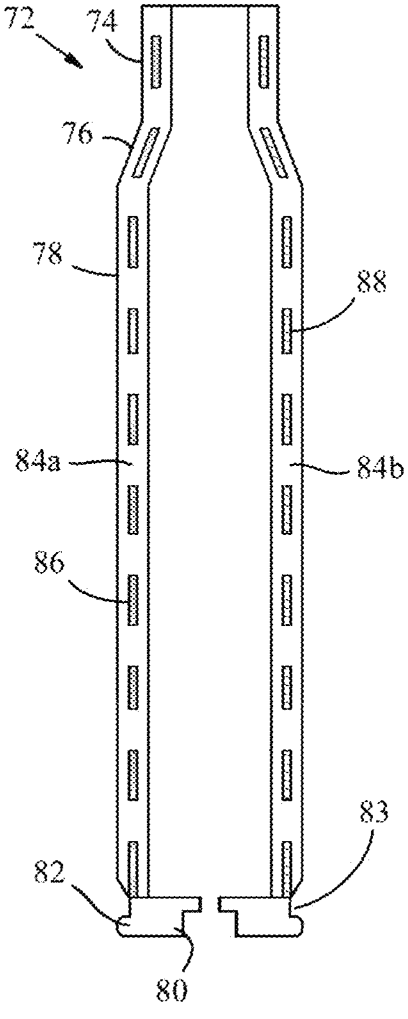
FIG. 5 is a cross-sectional side view, taken along line A-A, of a further embodiment of a longitudinal half of an ammunition casing according to the present invention.

FIG. 5 is a cross-sectional side view of a further alternative embodiment of one longitudinal half for a casing according to the present invention. Note, the cross-section of FIG. 5 is similarly taken along line A-A marked in FIG. 1. FIG. 5 illustrates a longitudinal half 72 that is substantially similar to those described above. The longitudinal half 72 thus includes a half neck 74 that extends to a half shoulder 76 which transitions into a half body 78. A half primer pocket 80 is formed through the half head 82, which extends from the half body 78. An extraction groove 83 is formed around the outer surface of the half head 82. A second, substantially identical longitudinal half is also provided and coupled together with the longitudinal half 72 to form a complete casing 10. The second longitudinal half is not shown in the drawings due to it being substantially identical to the longitudinal half 72 illustrated.

The longitudinal half 72 includes a first radial edge 84*a* and a second radial edge 84*b*. The means for coupling the longitudinal half 72 with a second, substantially identical longitudinal half to form a complete casing 10 is formed in the radial edges 84*a*, 84*b* of the longitudinal halves. In some embodiments, the coupling means may include one or more noncontinuous tongue segments 86 that engage with one or more noncontinuous grooves 88 on the second, substantially identical longitudinal half arranged to be complementary to the tongue segments 86. Note, in FIG. 5, the first radial edge 84*a* is shown having one or more noncontinuous tongue segments 86 while the second radial edge 84*b* is shown having one or more noncontinuous grooves 88. The second, substantially identical longitudinal half designed for coupling with the longitudinal half 72 includes the complementary arrangement of tongue segments 86 and noncontinuous grooves 88 formed in the radial edges thereof so the two halves can be engaged together to form the complete casing 10. In preferred embodiments, the seam formed on the outer surface of the casing where the two halves join is welded to complete the coupling means. Preferably, the outer surface of the casing is smooth, or is made smooth, after the weld is applied to ensure compatibility with existing firearms. In most preferred embodiments, the weld is applied according to known laser welding techniques.

Figure 6:
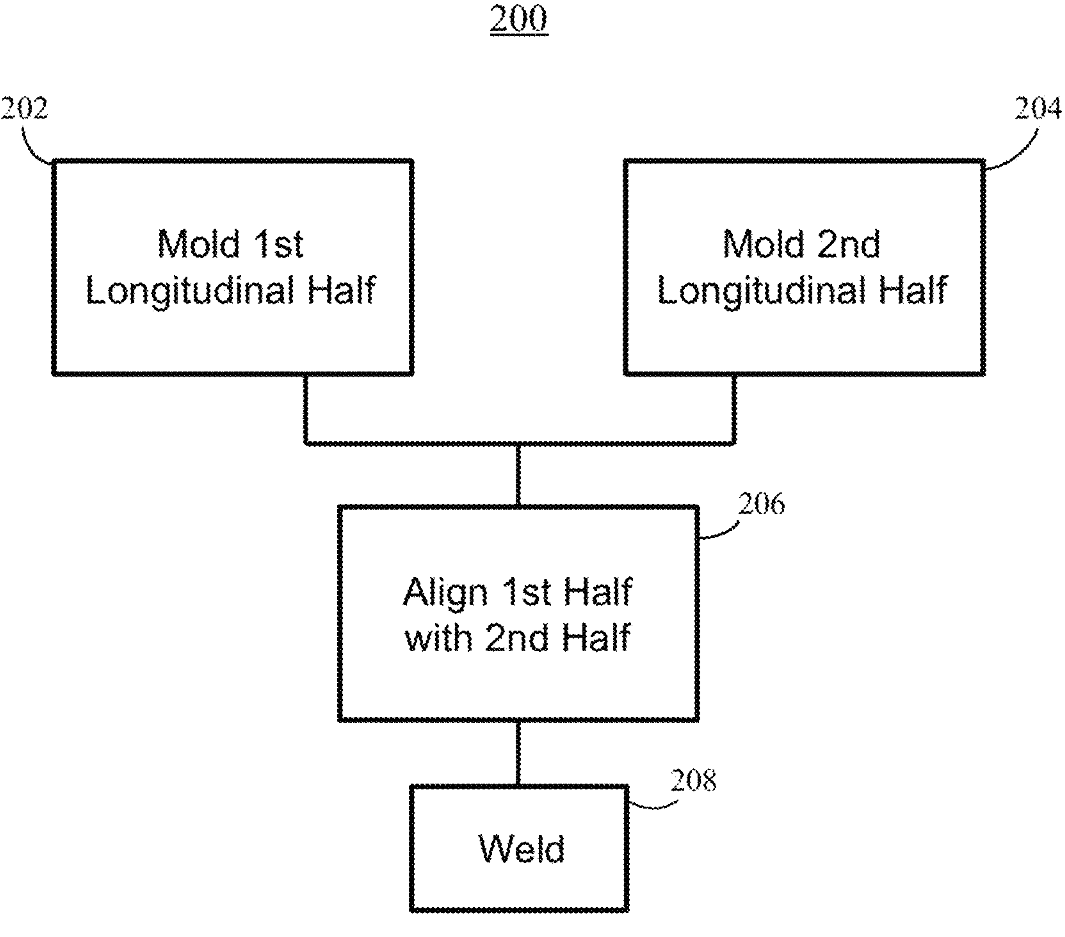
FIG. 6 is a flow chart diagramming the salient steps of an embodiment for a method for manufacturing an ammunition casing according to the present invention.

FIG. 6 is a flow chart diagramming the salient steps of an embodiment of a manufacturing method for a casing according to the present invention. At steps 202 and 204, the longitudinal halves of the casing are molded. Steps 202 and 204 may be performed in series or simultaneously depending on the production line setup. In the most efficient setups, an injection molding line for the first longitudinal half is set and a second injection molding line for the second longitudinal half is set. This allows for the simultaneous molding of each half of the casing and eliminates the need to swap mold designs. In preferred embodiments, steps 202 and 204 involve conventional injection molding techniques using a carbon fiber material or a carbon fiber reinforced polymer mix.

In preferred embodiments, the ratio of carbon fiber material to polymer material is between about 1:9 and 3:7. Injection molding using carbon fiber or a carbon fiber reinforced polymer mix requires careful consideration of the mold design and gate locations because the carbon fibers will tend to align parallel to the direction of the melt flow. In the context of the present invention, the fiber orientation that provides the desired strength to withstand the radial forces generated upon discharge is circumferentially around the cylinder, or perpendicular to the long axis of the casing. To promote the circumferential fiber orientation, the inventor has determined the optimal gate locations to be at the center of one end of the longitudinal half casing, e.g., at the bottom end 22, so that the melt flow direction is along the length of the longitudinal half casing which causes the fibers to orient circumferentially, i.e., perpendicular to the melt flow direction.

After molding the first and the second longitudinal halves in steps 202 and 204, the method 200 requires the two halves to be aligned at step 206. Preferably, step 206 involves the aligning the first longitudinal half 12 with the second longitudinal half 14 so that the coupling means 42 is aligned. Thereafter, the two halves 12 and 14 are pressed together causing the tongues 48 to engage with the complementary grooves 50. This forms the seam 34 in the outer surface 36 of the casing 10 where the two halves 12 and 14 are joined.

An optional inspection step may be included after alignment of the two halves in step 206. The inspection step may involve inspecting the bottom end 22 of each half to ensure the bottom ends of each half are coplanar. A similar inspection may be conducted at the top end of the casing, e.g., at the projectile opening 38, to ensure the end of each half neck is coplanar with the other. If after inspection it is determined that the two halves are not or cannot be properly aligned, each half may be crushed and the material recycled for further use.

After the two halves 12 and 14 have been properly aligned in step 206 (with or without the optional inspection step), the method 200 next requires a weld to be applied along the seam 34 in step 208. In preferred embodiments, step 208 involves conventional laser welding techniques, which utilizes a focused, high-intensity laser beam as the heat source. Laser welding is preferred for step 208 because laser welding minimizes the heat affected zone by using the highly focused laser beam which limits the heat spreading into the surrounding material. Laser welding is also significantly faster than other welding techniques and typically results in clean and uniform weld seams, which can minimize or eliminate the need for post-welding finishing processes. Further, laser welding techniques can control the depth of the weld by controlling the intensity of the laser beam. This allows a manufacturer to ensure the weld is limited to the thickness of the sidewall and does not penetrate the internal surfaces of the casing.

In some embodiments, a final diameter proofing step may be implemented. In this final diameter proofing step, the completed casing may be pressed through a die with a razor edge set to a diameter matching the required outer diameter for the casing. As the casing passes through the razor-edged die, excess material will be shaved off from the outer surface. This final diameter proofing step may be necessary to shave off excess material resulting from the weld along the seam 34 to ensure a smooth outer surface for the casing 10.

In alternative manufacturing methods, a casing according to the present invention may be made according to additive manufacturing processes, such as 3-D printing. In such manufacturing processes, the casing may be formed as a single, integrated unit, and not as two separate halves welded together. Preferably, a Fused Deposition Modeling ("FDM") process is used. Depending on the exact FDM process used and the specific requirements of the ammunition casing, the input material may vary. For example, in one FDM process, a base polymer material, such as Nylon, may be premixed with short, chopped strands of carbon fiber material to form the composite filament for printing. The composite filament is heated in the printing machine and then extruded through a nozzle onto the build platform. The ammunition casing is built up layer by layer through this process. In this FDM process, the carbon fibers are distributed randomly throughout the final product to provided added strength in all directions.

In some preferred FDM processes, the carbon fiber material begins as a single continuous fiber strand. This beginning carbon fiber strand is chopped into shorter segments, preferably between about 1/16 inch to about 1/4 inch. In a most preferred embodiment, the initial carbon fiber material is chopped into short segments of about 1/8 inch. The short carbon fiber segments are next mixed with the polymer material in a ratio between 1:9 and 3:7 carbon fiber-to-polymer. The mixture of carbon fiber and polymer is next fed into a blender to provide a homogenous carbon fiber reinforced resin that can be formed into the filament used for the additive manufacturing process. The blending step further chops the carbon fiber lengths. After blending, the length of the carbon fibers is further reduced from the preferred 1/8 inch to between about 1/24 inch to about 1/40 inch. Preferably, the blending step provides a final carbon fiber segment length of about 1/32 inch. The carbon fiber reinforced polymer material, in a ratio of between 1:9 to 3:7 carbon fiber-to-polymer, is then used in the FDM manufacturing process. Dimensions and ratios presented herein may represent nominal values or average values, which skilled artisans understand to include expected tolerances that are consistent with normal distribution that results from modern manufacturing processes. For example, the foregoing and following dimensional values and ratios may include a tolerance such as +/−1%, 2%, 5%, 10%, or 20%, and still fall within the scope of the invention.

In an alternative FDM process, a dual nozzle head is used and the polymer material and the carbon fiber material remains separated. In this process, one nozzle extrudes the polymer material to form a matrix of the casing and the other nozzle lays down a continuous strand of the carbon fiber in a predetermined path. The continuous strand of carbon fiber is embedded within the polymer matrix during the process. The continuous strands of carbon fiber provide directional strength to the casing along the length of the carbon fiber strands. The radial strength of an ammunition casing printed according to this FDM process using continuous strands of carbon fiber may be greater than the strength provided by the chopped strands discussed above.

In such additive manufacturing processes using carbon fiber, the casing can be manufactured as single unit, e.g., not required to be printed in two longitudinal half sections. Depending on the size of the FDM printer and build platform, a plurality of ammunition casings may be printed in a single operation.

Figure 7:
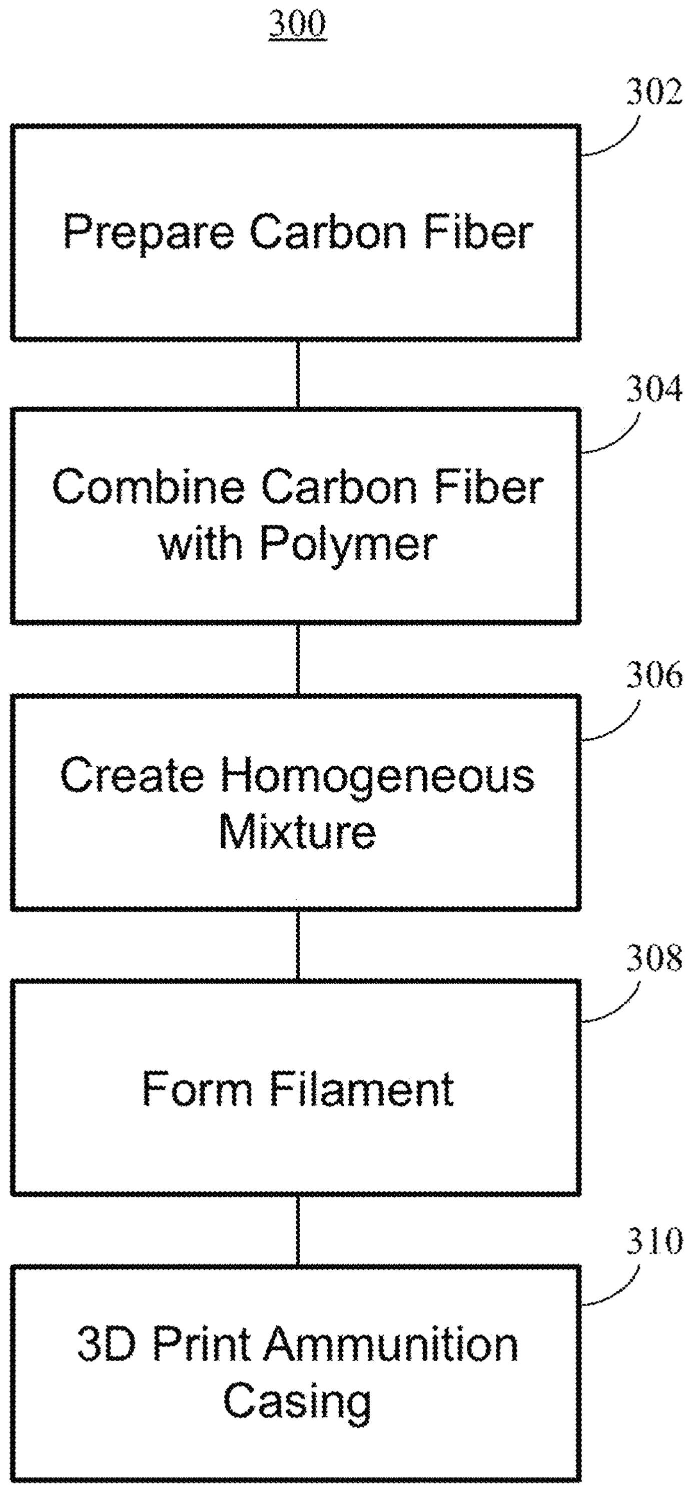
FIG. 7 is a flow chart diagramming the salient steps of an alternative embodiment for a method of manufacturing an ammunition casing according to the present invention.

FIG. 7 is a flow chart diagramming the salient steps of an alternative manufacturing method for an ammunition casing according to the present invention. Method 300 involves additive manufacturing processes, such as the 3-D printing processes described above. In step 302, the carbon fiber material is initially prepared. This may involve chopping the initial carbon fiber material, which may come in rolls with a continuous strand length of about 8-feet. Preferably, the carbon fiber material is chopped into short segments of about 1/8 inch. Step 304 involves combining the prepared carbon fiber material, i.e., the short carbon fiber segments, with the polymer material. In some embodiments, the polymer material may be small polymer pellets. Preferably, the carbon fiber and polymer materials are combined in a ratio between about 1:9 to 3:7 carbon fiber-to-polymer. Step 306 involves creating a homogeneous mixture of the carbon fiber and polymer materials. Preferably, the homogeneous mixture is created by blending the combined carbon fiber and polymer materials. The result of step 306 is to further chop the carbon fiber segments into even shorter segments, preferably about 1/32 inch. In step 308, the filament for the additive manufacturing process is created. Typically, this involves heating the homogenous mixture of carbon fiber and polymer materials and extruding the heated mixture into a composite filament having dimensions suitable for additive manufacturing. The final step, step 310, involves 3-D printing the ammunition casing, using the filament produced by step 308, according to known 3-D printing processes, e.g., FDM processes described above.

There are numerous benefits for ammunition casings made according to the present invention when compared to prior polymer cases and legacy metal cases. Casings according to the present invention, being manufactured primarily out of carbon fiber, have a greater strength to weight ratio when compared to polymer and metal casings. The carbon fiber material is extremely lightweight, with a density around 1.5 to 1.7 g/cm$^3$ compared to brass which has a density of 8.4 to 8.7 g/cm$^3$. Some embodiments of the present invention provide an 80% reduction in the overall casing weight compared to legacy metal casings. For example, an empty 0.308 Winchester caliber metal casing weighs on average about 10 grams. In comparison, a carbon fiber ammunition casing according to the present invention weighs only about 2 grams. This is a drastic weight reduction without compromising on the reliability of the casing due to the strength provided by the carbon fiber material.

Further, carbon fiber material has poor thermal conductivity properties, meaning the casing according to the present invention will not transfer as much heat to the firearm chamber during and after discharge. This may allow for higher rates of sustained fire without the need for a stoppage to allow the firearm to cool.

The present invention may be embodied in ammunition casings of a variety of calibers. The present invention can readily be scaled up or down to provide different calibers of ammunition casings for small arms, e.g., scaled down to .22 Long Rifle caliber and scaled up to .50 BMG caliber. The present invention may also be embodied in casings for medium and large caliber ammunition as well, e.g., 20 mm up to 155 mm.

Exemplary embodiments of the invention have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A method for manufacturing an ammunition casing, comprising:
- preparing a continuous strand of carbon fiber into short carbon fiber segments;
- combining the short carbon fiber segments with a polymer material;
- blending the combined short carbon fiber segments and polymer material into a homogeneous mixture, wherein the short carbon fiber segments are shortened further;
- forming a filament from the homogeneous mixture; and
- 3-D printing the ammunition casing from the filament.

2. The method of claim 1, wherein the carbon fiber and the polymer material are combined in a ratio between 1:9 to 3:7 carbon fiber-to-polymer.

3. The method of claim 1, wherein the polymer material comprises nylon.

4. The method of claim 1, wherein the preparing of the continuous strand of carbon fiber comprises chopping the continuous strand of carbon fiber into the short carbon fiber segments.

5. The method of claim 4, wherein the short carbon fiber segments are chopped into segment lengths between about 1/16 inch and about 1/4 inch.

6. The method of claim 5, wherein shortening of the short carbon fiber segments during the blending step provides shortened carbon fiber segments having a final segment length between about 1/24 inch and about 1/40 inch.

7. The method of claim 6, wherein the 3-D printed ammunition casing is a 0.308 Winchester caliber ammunition casing.

* * * * *